(12) United States Patent
Koelle et al.

(10) Patent No.: US 6,353,307 B1
(45) Date of Patent: Mar. 5, 2002

(54) CONTROLLED RECTIFIER BRIDGE WITH OVER-VOLTAGE PROTECTION

(75) Inventors: Gerhard Koelle, Wiernsheim; Albert Geiger, Eberdingen; Christof Hackler, Berleburg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,125

(22) PCT Filed: Jul. 27, 1999

(86) PCT No.: PCT/DE99/02300

§ 371 Date: Jun. 5, 2000

§ 102(e) Date: Jun. 5, 2000

(87) PCT Pub. No.: WO00/08747

PCT Pub. Date: Feb. 17, 2000

(30) Foreign Application Priority Data

Aug. 5, 1998 (DE) .......................................... 198 35 316

(51) Int. Cl.[7] ................................................ H02P 9/10
(52) U.S. Cl. .............................. 322/59; 322/89; 322/91; 322/37
(58) Field of Search .............................. 322/17, 22, 27, 322/28, 37, 59, 89, 99, 91

(56) References Cited

U.S. PATENT DOCUMENTS

| 4,379,990 A | * | 4/1983 | Sievers .......................... 322/99 |
| 4,825,139 A | | 4/1989 | Hamelin et al. ............... 322/90 |
| 5,187,426 A | * | 2/1993 | Maass et al. ................... 322/63 |
| 5,325,044 A | * | 6/1994 | Bartol ........................... 322/25 |
| 5,656,922 A | * | 8/1997 | LaVelle et al. ................ 322/46 |
| 6,111,390 A | * | 8/2000 | Inaba et al. .................... 322/28 |
| 6,153,945 A | * | 11/2000 | Koss et al. .................. 307/10.1 |

* cited by examiner

Primary Examiner—Nicholas Ponomarenko
(74) Attorney, Agent, or Firm—Michael J. Striker

(57) ABSTRACT

A controlled rectifier bridge for a generator having a plurality of phase windings and one exciter winding is constructed as a self-controlled rectifier bridge with MOS field effect transistor. To allow the use of such a rectifier bridge upon a fast load reduction with an attendant load-dump voltage, a voltage protection circuit is employed that feeds the energy, stored in the exciter winding upon a fast shutoff, back into the battery, thus deexciting the exciter winding. Upon a fast load reduction, the generator windings are short-circuited by suitable triggering of the low- or high-side transistors.

4 Claims, 2 Drawing Sheets

CONTROLLED RECTIFIER BRIDGE WITH OVER-VOLTAGE PROTECTION

The invention is based on a controlled rectifier bridge with surge protection for a generator, in particular for a rotary current generator used in a vehicle, as generically defined by the preamble to the main claim.

1. Prior Art

Electrical energy for an on-board vehicle electrical system is typically done with a rotary current generator driven by the internal combustion engine of the vehicle, and the output voltage of the rotary current generator is regulated by a voltage regulator. With the aid of a rectifier bridge, the output voltage of the generator is converted into a direct voltage. Typically six Zener diodes, which are located between the positive and negative terminals of the generator, are used as the rectifier bridge.

However, it is also known instead of Zener diodes to use triggerable rectifier elements that are triggered by control means. The use of a controlled rectifier bridge is described for instance in U.S. Pat. No. 4,825,139. The use of MOS field effect transistors in the rectifier bridge is also proposed there. With the aid of a controlled rectifier bridge of this kind, a generator regulation can be performed that even at low rpm makes a generator output voltage possible that is suitable for supplying the vehicle electrical system.

2. Advantages of the Invention

The controlled rectifier bridge of the invention with protection circuit has the advantage over the prior art that the voltage peaks that occur upon a load dump are reduced. Reducing these voltage peaks is necessary if a self-controlled rectifier bridge with MOS field effect transistors is used.

These advantages are attained by using a controlled rectifier bridge with protection circuit as defined by the combination of characteristics of claim 1. With this controlled rectifier bridge with protection circuit, the voltage surges that occur upon a load dump as a result of the magnetic energy stored in the exciter winding of the generator are rapidly reduced, because the stored energy is fed back into the battery.

Further advantages of the invention are attained by the provisions recited in the dependent claims. It is especially advantageous that as a result of the feedback of the exciter current, a rapid drop in the load-dump voltage caused by the load dump is attained; the short-circuit current caused by this load-dump voltage, which in the event of a short circuit has to be controlled by the MOS field effect transistors, can be kept especially low.

DRAWING

Figure 1:
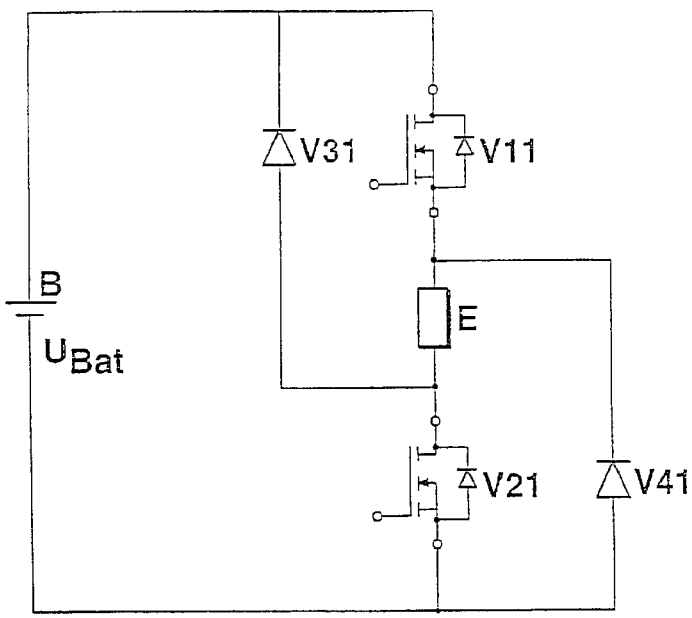
Figure 2:
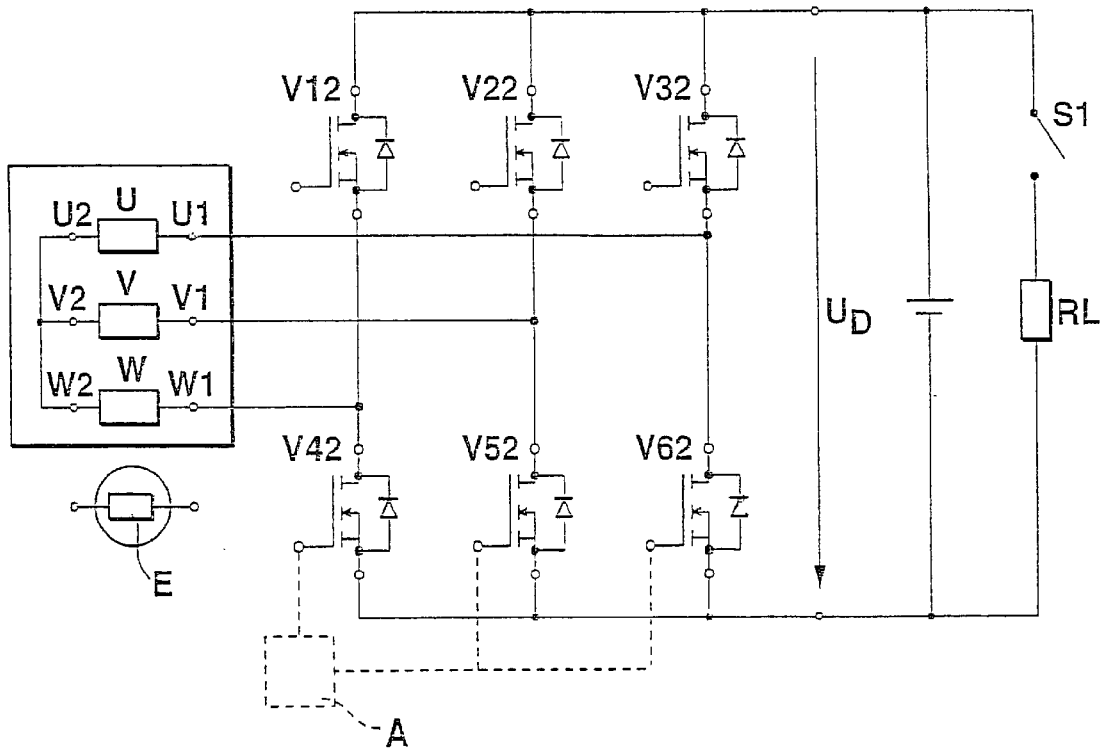
Figure 3:
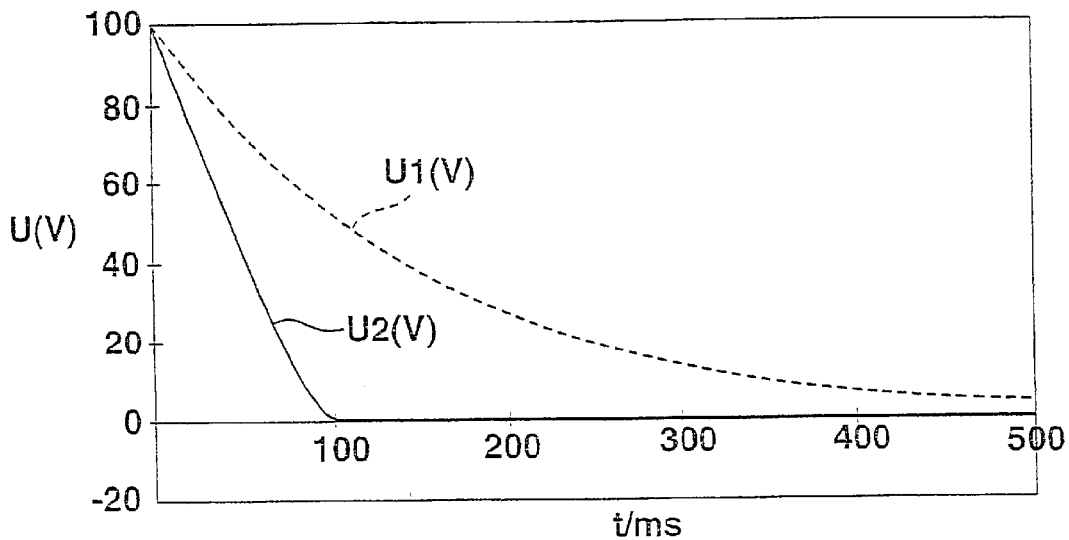
Figure 4:
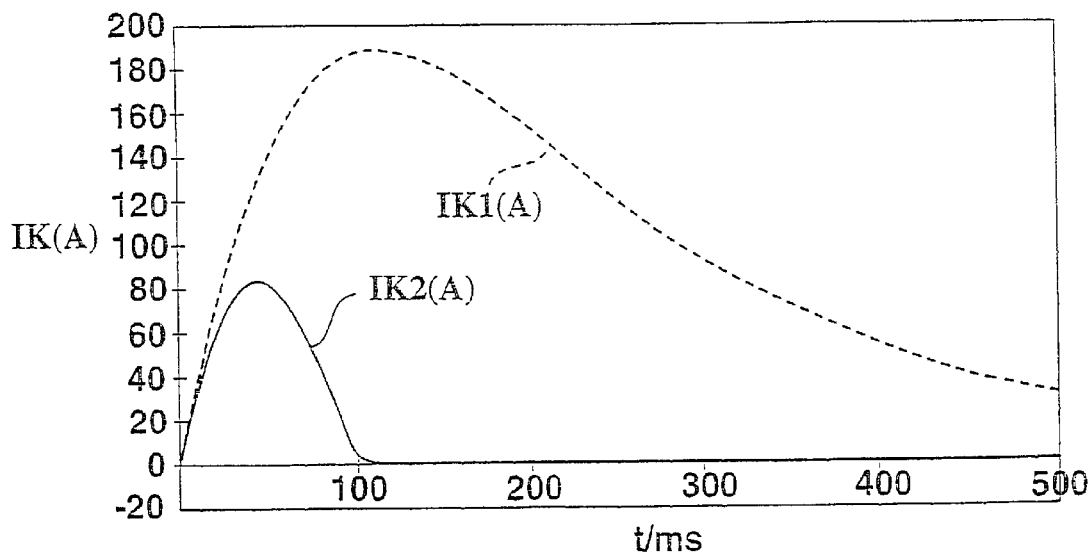

One exemplary embodiment of the invention is shown in the drawing and will be described in further detail in the ensuing description. Individually, FIG. 1 shows a circuit for preventing the load-dump voltage that is caused by the load dump. In FIG. 2, a generator with a self-controlled rectifier bridge is shown; and FIGS. 3 and 4 show the course of the load-dump voltage and the associated current course upon a short circuit of the low-side transistors of the rectifier bridge, on the one hand in normal operation and on the other in the deexcitation by battery feedback according to the invention.

DESCRIPTION

In FIG. 1, a circuit for preventing the load-dump voltage that can occur upon a sudden load dump is shown.

This circuit arrangement is assigned to the exciter windings of the generator; it includes the two semiconductor valves V11 and V21, which by way of example are MOS field effect transistors. By way of the two transistors V11 and V21, the exciter winding E can be connected to the battery B. The triggering of the transistors V11 and V21 is effected with the aid of a voltage regulator not shown in further detail, which varies the gate potential of the MOSFETs. When the transistors V11 and V21 are conducting, the voltage $U_{Bat}$ is applied to the exciter winding E. With the aid of the two transistors V11 and V21, the voltage regulator adjusts the exciter current IE flowing through the exciter winding E in such a way that the output voltage of the generator assumes the desired level. A reduction in the output voltage of the generator is attained by shutting off the exciter current. Since upon the shutoff of the exciter current IE, a contrary voltage is induced in the exciter winding, in the circuit of FIG. 1 two semiconductor valves V31 and V41, such as diodes, are provided, which upon shutoff of the exciter current or in other words when the transistors V11 and V21 are blocked return the magnetic energy, stored in the exciter winding E, to the battery B. Particularly in the case of a load dump, that is, an operating state in which the load of the generator is very rapidly reduced, for instance because of a load dump or the shutoff of strong electrical consumers, it is necessary that the established load-dump voltage be rapidly reduced. This reduction is attained with the semiconductor valves V31 and V41.

In FIG. 2, a generator G1 and a self-controlled rectifier bridge, assigned to the generator G1 and having six semiconductor elements, such as MOSFETS, is shown, for which a circuit of FIG. 1 can be especially advantageously used. Of the generator G1, the stator windings U, V and W and the exciter winding E are shown. The exciter winding E corresponds to the exciter winding E of FIG. 1. The terminals of the stator windings U, V and W are designated U1, U2, V1, V2, W1, and W2. The interconnection between the generator G1 and the rectifier bridge is such that two field effect transistors each V12, V42 V22, V52; V32, V62 form one series circuit. The junctions of each two series-connected transistors lead to the generator terminals W1, V1 and U1. The various terminals remote from one another of the transistors V12 through V62 are each connected to one another. Between the associated terminals, the voltage UD occurs, which acts as the output voltage of the generator for loading the battery B or for supplying the electrical loads RL.

Upon a rapid opening of the switch S1, or upon an unwanted load dump, on the one hand the feedback of the voltage induced in the exciter winding to the battery, already explained in conjunction with FIG. 1, takes place, and on the other, the transistors V12 through V62 of the rectifier bridge are triggered in such a way that an occurrence of the load-dump voltage is averted. To that end, with the aid of a short circuit of the so-called low-side transistors V42, V52 and V62, or alternatively of the highside transistors V12, V22, V32, a short circuit of the generator windings is obtained. The low- or high-side transistors are triggered by a trigger circuit A, which is for instance integrated with the voltage regulator, in such a way that the desired short circuit occurs. To that end, a suitable control voltage is applied to the gate terminal of the transistors, such as the MOS field effect transistors. If the voltage regulator detects that the load-dump voltage is below a predeterminable defined voltage limit, then the short circuit of the low- or high-side transistors is cancelled by suitable triggering, and the self-controlled rectifier having the transistors V12 through V62 resumes actual operation.

By combining the two circuit arrangements shown in FIGS. 1 and 2, a generator with a MOS field effect transistor that has load-dump protection can be achieved, so that even upon a load dump, no voltage surges can occur. In FIG. 3, two examples for the voltage course of the load-dump voltage are shown, in normal operation U1 [V] and upon deexcitation by battery feedback U2 [V], which make the advantages of the invention apparent. In normal operation, that is, in a generator with MOS field effect transistors without switching to prevent the load-dump voltage of FIG. 1, the load-dump voltage drops from its maximum value, for instance 100 V, only slowly, while upon a deexcitation by battery feedback, a complete deexcitation is obtained after only 100 ms. For the current course in the load-dump situation upon a short circuit of the low-side transistors as shown in FIG. 4, a sharp rise in the current and only a slow drop occur in normal operation IK1 [A], while upon deexcitation by battery feedback, the maximum current intensity is substantially less, and after only 100 ms, the short-circuiting current has already faded back to 0. The current course is plotted as IK2 [A] over the time t. As FIGS. 3 and 4 show, with the aid of the deexcitation of the exciter winding by battery feedback, a rectifier bridge with MOS field effect transistors that functions reliably even in the case of a load dump and maximally prevents voltage surges can be constructed.

What is claimed is:

1. A controlled rectifier bridge for a generator having a plurality of phase windings and one exciter winding, which includes rectifier elements embodied as MOS field effect transistors that are connected to the phase windings of the generator and that rectify the voltage supplied to the generator before it is delivered to a battery and to electrical loads, in which the level of the generator voltage is regulated by means of a voltage regulator that varies the exciter current flowing through the exciter winding, characterized in that the exciter winding is assigned a protection circuit, which converts the magnetic energy, stored in the exciter winding upon a rapid reduction of load, into electrical energy and feeds it back into the battery, thereby deexciting the exciter winding.

2. The controlled rectifier bridge for a generator having a plurality of phase windings and one exciter winding of claim 1, characterized in that the protection circuit includes two semiconductor switches (V11 and V21), which are connected in series with the exciter winding and in parallel with the battery (B); that a further semiconductor element (V31) is connected parallel to the semiconductor element (V11) and to the exciter winding (L); and that a semiconductor element (V41) is connected parallel to the exciter winding and to the semiconductor element (V21).

3. The controlled rectifier bridge for a generator having a plurality of phase windings and one exciter winding of claim 2, characterized in that the semiconductor elements (V11 and V21) are field effect transistors, and that the semiconductor elements (V31 and V41) are diodes, which are each disposed such that the semiconductor element (V31) conducts positive voltages to the battery (B), and the semiconductor element (V21) conducts negative voltages to the corresponding terminal of the battery (B).

4. The controlled rectifier bridge for a generator (G1) having a plurality of phase windings and one exciter winding of claim 1, characterized in that either the low-side transistors (V41, V52 and V62) of the rectifier bridge that are connected to ground, or the highside transistors V12, V22, V32 that are connected to Br are triggerable in such a way that upon a load-dump voltage occurring from a fast load reduction, they short-circuit the generator windings (U, V, W).

* * * * *